United States Patent
Kaiser et al.

[11] Patent Number: 5,890,861
[45] Date of Patent: Apr. 6, 1999

[54] RETAINING ELEMENT FOR MULTIPART CONNECTION UNITS SUCH AS SCREW CONNECTIONS AND THE LIKE

[75] Inventors: Eberhard Kaiser, Marienheide; Volker Zieris, Burscheid, both of Germany

[73] Assignee: Armaturenfabrik Hermann Voss GmbH + Co., Wipperfurth, Germany

[21] Appl. No.: 801,478

[22] Filed: Feb. 18, 1997

[51] Int. Cl.[6] .............................. F16B 21/00; F16B 21/18
[52] U.S. Cl. .......................... 411/426; 411/353; 411/512; 411/999
[58] Field of Search ................................... 411/352, 353, 411/512, 525, 526, 527, 541, 546, 970, 999

[56] References Cited

U.S. PATENT DOCUMENTS

| | | | |
|---|---|---|---|
| 1,348,517 | 8/1920 | Porter | 411/353 |
| 2,492,115 | 12/1949 | Crowther | 411/353 |
| 2,558,966 | 7/1951 | Lane, Jr. | 411/546 X |
| 3,388,227 | 6/1968 | Basso et al. | 411/541 X |
| 3,987,697 | 10/1976 | Wurzel | 411/353 |
| 5,713,692 | 2/1998 | McCarrick et al. | 411/526 X |

*Primary Examiner*—Neill Wilson
*Attorney, Agent, or Firm*—Jones & Askew

[57] ABSTRACT

A retaining element to hold together a multipart preassembled screw connection or the like until the assembly can be further processed or assembled in a later step. The retaining element includes a ring section to be installed on a free part of the multipart connection unit so as to hold together the individual parts of that section, and a handle that extends in an outward radial direction from the ring section. Once the free part of a multipart connection unit is assembled to a mating connection unit, the ring section can be removed by applying a tensile force to the handle in an upward radial direction. The ring section may have a predetermined breaking point so that the ring section becomes severed when sufficient tensile force is applied, whereby the retaining element can be removed without difficulty.

6 Claims, 2 Drawing Sheets

RETAINING ELEMENT FOR MULTIPART CONNECTION UNITS SUCH AS SCREW CONNECTIONS AND THE LIKE

FIELD OF THE INVENTION

The present invention pertains to a retaining element for multipart connection units such as screw connections and the like. More specifically, this retaining element must hold together a multipart preassembled screw connection or the like until the same eventually can be further processed or assembled at a different location in a later step.

BACKGROUND OF THE INVENTION

Such a retaining element for securing multipart screw connections is already known. Thus, more specifically, a retaining cap is known which, if necessary, can be placed on a threaded end in order to hold together individual parts arranged on a screw or threaded rod such as washers, sealing rings and the like as a preassembled unit so as to prevent loss. This type of cap nevertheless has the disadvantage that it is suitable mainly for use with an end piece which features a thread.

In addition, stoppers are known for the purpose of this type of retention, which can be inserted into the respective end piece of a tube and/or internally threaded element and the end of which is radially expanded such that the individual parts assembled on the respective tube or internally threaded element are held together so as to prevent loss.

It is a disadvantage of both known retaining elements that they must be removed prior to assembly of the multipart connection unit. However, this can even lead to the loss of some preassembled individual parts shortly before assembly, particularly where spatial conditions are confined.

BRIEF SUMMARY OF THE INVENTION

The underlying purpose of the present invention is to create a retaining element which eliminates the aforementioned disadvantages, is extremely simple and economical to produce and which facilitates an expanded range of applications.

In accordance with the invention, this is achieved by means of a retaining element which consists of a ring section and a handle which sticks out fundamentally in an outward radial direction, with the ring section being able to be installed nonpositively and/or positively locked on a free section of the multipart connection unit such that the individual parts of the connection unit are held together so as to prevent loss and/or are correspondingly positioned and the ring section can be removed, while undergoing deformation, by applying a tensile force to the handle in an outward radial direction. In accordance with the invention, a retaining element consequently is created which not only can be assembled to the end section of a multipart connection unit, but likewise can be installed during preassembly on a tubular or rod-shaped body, between individual parts of a multipart connection unit for the purpose of spacing or prepositioning the individual parts. Consequently, even a center region of a multipart screw connection or the like can be "kept free", to advantage, for a later assembly, e.g., of washers or sealing rings or other movable individual parts. In addition, the retaining element in accordance with the invention simplifies later assembly such that, e.g., a multipart screw connection unit, one end of which is secured with the retaining element in accordance with the invention, can be screwed several threads deep into a corresponding counterpart without the need to remove the retaining element beforehand. It is consequently guaranteed, to advantage, that no individual parts of the multipart connection unit will be lost during assembly. In accordance with the invention, the retaining element then can be removed by means of a radial tensile force applied to its handle and finally the screw-in process finished.

The retaining element in accordance with the invention is suited particularly for multipart line connections and screw connections, such as PA lines provided with annular pieces. These lines are provided with internally threaded elements and sealing rings and, when secured with a retaining element in accordance with the invention, represent a ready-to-install line with a high degree of efficiency.

Additional advantageous design features and embodiments are contained in the following figures.

DETAILED DESCRIPTION OF THE PREFERRED EMBODIMENT

Figure 1:
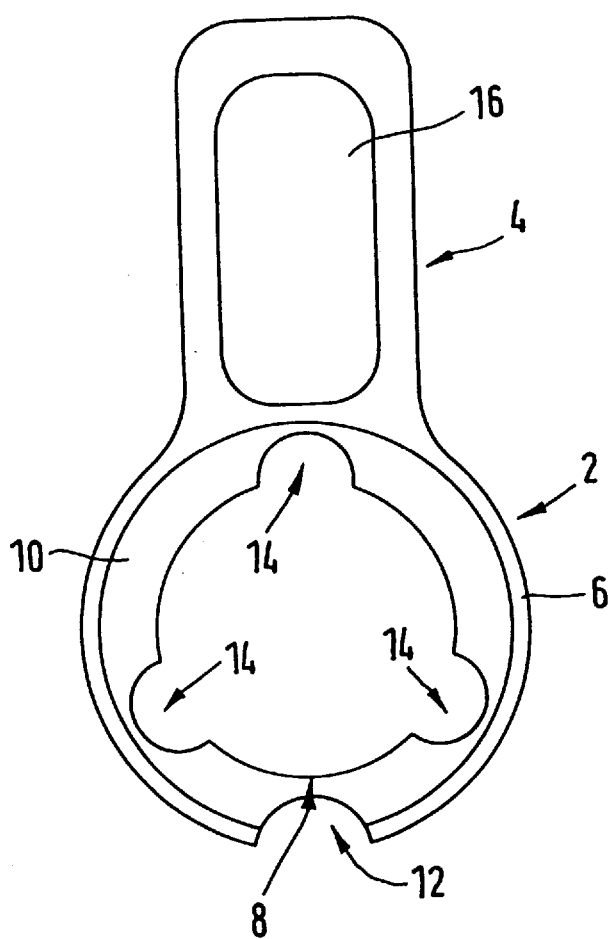
FIG. 1: A possible embodiment of a retaining element in accordance with the invention, in front view.

FIG. 1 shows a possible embodiment of a retaining element in accordance with the invention, in front view. This retaining element consists, in essence, of a ring section (2) and a handle (4) which projects essentially radially outwards. In this connection, these two parts preferably are constructed as a one-piece plastic molded part. In the embodiment of the retaining element represented in FIGS. 1–3, the ring section (2) is constructed as a closed ring element and features a predetermined breaking point (8) on at least one location of its ring wall (6). It is advantageous for the ring section (2) to feature a clamping section (10) directed radially inward, which is constructed to be elastic such that a ring section (2) installed on a section of a multipart connection unit is held on said section in a clamped manner. It is preferable for the clamping section (10) of the ring section (2), which serves for a nonpositively or positively locked retention, to be constructed as a clamping lip which extends radially inward from the periphery of the ring wall (6). The predetermined breaking point (8) is realized, more specifically, by means of a material diminution of the ring section (2), such that, as represented in FIG. 1, the periphery of the ring wall (6) is interrupted and the ring section (2) features a recess (12), which is directed radially inward, extending up to the region of the clamping lip is open toward the outside at the edge. In this connection, the material diminution of the ring section (2) caused by the recess (12) is dimensioned such that the ring section (2) of the retaining element can be removed, while undergoing deformation, by applying an outward radial tensile force to the handle (4). In the embodiment represented, this tensile force causes the ring section (2) to be severed in the region of the recess (12) such that the retaining element can be removed without trouble.

In another embodiment of the retaining element, not represented, the ring section (2) is constructed with a ring element which is open at the periphery and is radially elastic. In this embodiment, the retaining element can be removed by applying a radially outward tensile force to the handle (4) without destruction of the ring section (2). This embodiment of the retaining element consequently can be reused or can be used as a separate holding and retention tool.

Figure 2:
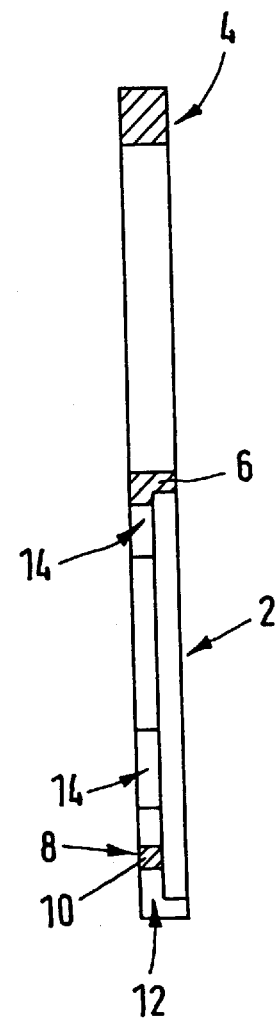
FIG. 2: The retaining element in accordance with the invention according to FIG. 1, in side view.

It is preferable for the clamping section (10), constructed in FIGS. 1 and 2 as a clamping lip, to feature at least one edge recess (14), opening radially inward, which serves to increase the elasticity of the remaining clamping lip regions. In the preferred embodiment represented, the clamping lip features, more specifically, three uniformly spaced recesses (14) spaced about the periphery. Assembly of the retaining element in accordance with the invention is simplified substantially by means of the thus increased elasticity of the remaining clamping lip regions. Consequently, the retaining element can more easily be pushed onto or screwed onto a section of a multipart a connection unit.

It is preferable for the handle (4) to be arranged to lie diametrically opposite the, or a, predetermined breaking point (8). In the embodiment represented, the recesses (14) are uniformly spaced at each 120° on the clamping lip of the ring section (2). In addition, it is advantageous, for a uniform distribution of force during the process of detaching a retaining element in accordance with the invention, if the handle (4) as well as one recess (14) and the recess (12) which represents the diminution lie on one axis. It is preferable for the recesses (14) of the clamping lip as well as the recess (12) which-forms the material diminution of the ring section (2) to be constructed in a semicircular shape.

It is preferable for the handle (4) to feature an opening (16). This opening (16) is provided, on one hand, for reasons of cost or material savings and, on the other hand, it guarantees an improved handling. Thus, it is possible, for example, to engage the opening (16) with a tool or the like, and consequently to exert an increased tensile force on the ring section (2).

Figure 3:
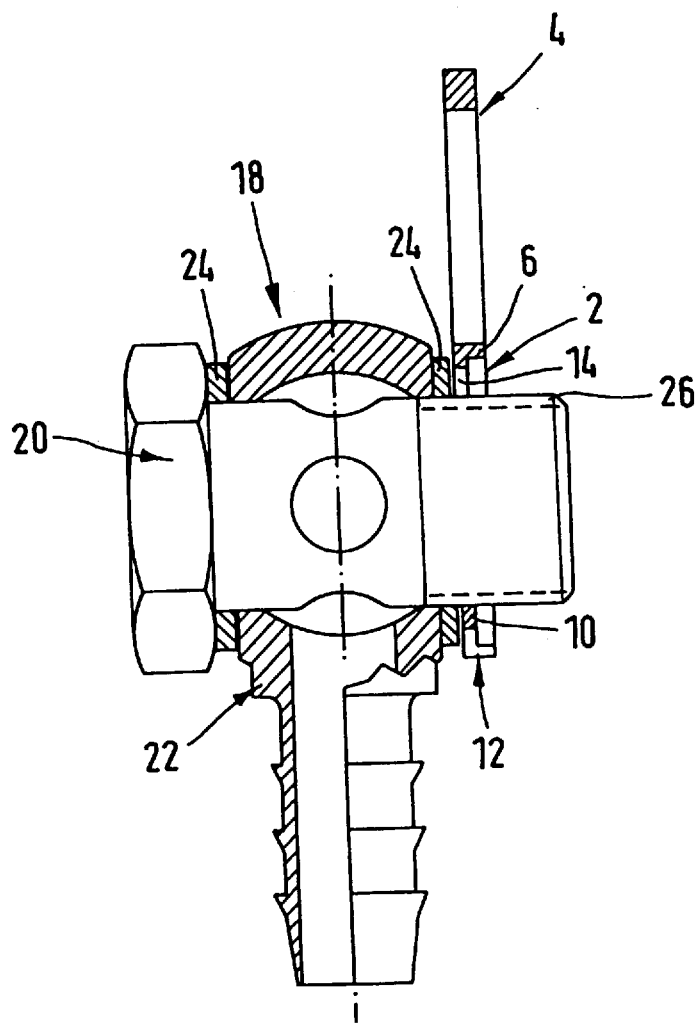
FIG. 3: A multipart connection unit secured with a retaining element in accordance with the invention, in partial section.

In FIG. 3, a multipart connection unit (18) is represented per example, which is secured with a retaining element in accordance with the invention. More specifically in this connection, an internally threaded element (20) and a tubular fitting (22) are connected together. In this connection, the internally threaded element (20) is guided transverse to the longitudinal extension off the tubular fitting (22) through the latter and sealed of from it at both sides with sealing elements (24). If these parts are preassembled, they are then secured by installing the retaining element in accordance with the invention, such that they are held together so as to prevent loss. It is clearly recognizable from this example that a preassembled and secured connection unit (18) readily can be further assembled in a later step, without the retaining element. having to be removed beforehand. In accordance with the invention, the multipart connection unit (18), after preassembly and securing by means of the retaining element in accordance with the invention now can be assembled by screwing the threaded section (26) of the internally threaded element (20) onto a corresponding counterpart, without the danger existing of losing individual parts of the connection unit (18) in this connection. Once the internally threaded element (20) has been partly screwed into a corresponding counterpart, the individual parts of the connection unit (18) no longer can be lost and the retaining element in accordance with the invention can be removed by applying a radial tensile force to the handle (4) and the internally threaded element (20) further screwed down to finish. The invention is not limited to the embodiment illustrated and described, but also includes all embodiments acting equally in the sense of the invention. Thus, for example, it is conceivable to construct the retaining element as described which has a ring section which is open at the periphery and consists of a material which guarantees a radial elasticity of the ring section. In this embodiment, the retaining element in accordance with the invention could consist, e.g., of an elastic plastic material or else of spring steel or the like.

We claim:

1. Retaining element for a multipart connection units such as screw connections and the like, comprising:

a ring section and a handle which projects essentially radially outwards, with the ring section being able to be installed positively locked in an open section of the multipart connection unit such that the individual parts of the connection unit are held together so as to prevent loss or are correspondingly positioned and so that the ring section can be removed, while undergoing deformation, by applying a radial outward tensile force to the handle; and the ring section is closed at the periphery and has a predetermined breaking point in at least one location of its periphery.

2. The retaining element of claim 1, characterized in that the predetermined breaking point (8) is realized by means of a material diminution of the ring section (2).

3. Retaining element for a multipart connection units such as screw connections and the like, comprising;

a ring section and a handle which projects essentially radially outwards, with the ring section being able to be installed positively locked in an open section of the multipart connection unit such that the individual parts of the connection unit are held together so as to prevent loss or are correspondingly positioned and so that the ring section can be removed, while undergoing deformation, by applying a radial outward tensile force to the handle;

the ring section having a clamping section directed radially inward, and being elastic such that the ring section installed in a section of a multipart connection unit is positively locked to the section of the connection unit; and the clamping section defining a clamping lip having at least one recess with a radially inward-directed open edge, which serves to increase the elasticity of the clamping lip and consequently serves to ease assembly.

4. Retaining element for a multipart connection units, such as screw connections and the like, comprising;

a ring section and a handle which projects essentially radially outwards, with the ring section being able to be installed positively locked in an open section of the multipart connection unit such that the individual parts of the connection unit are held together so as to prevent loss or are correspondingly positioned and so that the ring section can be removed, while undergoing deformation, by applying a radially outward tensile force to the handle; and the ring section having a clamping section directed radially inward and being elastic such that the ring section installed in a section of a multipart connection unit is positively locked to the section of the connection unit; and the clamping section is constructed as a clamping lip having three recesses spaced about the periphery of the clamping lip.

5. The retaining element of claim 4, characterized in that the three recesses (14) of the clamping lip are arranged in a uniform distribution about the periphery and one of the recesses (14), the handle (4) and the predetermined breaking point (10) lie on a common axis.

6. Retaining element for a multipart connection units, such as screw connections and the like, comprising;

a ring section and a handle which projects essentially radially outwards, with the ring section being able to be installed positively locked in an open section of the multipart connection unit such that the individual parts of the connection unit are held together so as to prevent loss or are correspondingly positioned and so that the ring section can be removed, while undergoing deformation, by applying a radially outward tensile force to the handle; and the handle is substantially diametrically opposite a predetermined breaking point of the ring section.

* * * * *